US011575255B2

(12) United States Patent
Itzler et al.

(10) Patent No.: US 11,575,255 B2
(45) Date of Patent: Feb. 7, 2023

(54) CIRCUIT INTERRUPTING DEVICE FOR PROVIDING GROUND FAULT AND OPEN NEUTRAL PROTECTION IN TEMPORARY POWER APPLICATIONS

(71) Applicant: Hubbell Incorporated, Shelton, CT (US)

(72) Inventors: Roy Itzler, Orange, CT (US); Nicole Gay, Thomaston, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/563,765

(22) Filed: Dec. 28, 2021

(65) Prior Publication Data

US 2022/0123545 A1    Apr. 21, 2022

Related U.S. Application Data

(63) Continuation of application No. 17/097,773, filed on Nov. 13, 2020, now Pat. No. 11,211,782.
(Continued)

(51) Int. Cl.
*H02H 3/32* (2006.01)
*H02H 3/10* (2006.01)
(Continued)

(52) U.S. Cl.
CPC ............. *H02H 3/38* (2013.01); *H02H 3/105* (2013.01); *H02H 3/325* (2013.01); *H02H 3/34* (2013.01); *H02H 3/347* (2013.01)

(58) Field of Classification Search
None
See application file for complete search history.

(56) References Cited

U.S. PATENT DOCUMENTS 5,786,971 A * 7/1998 Chan ...................... H02H 3/347
361/45
5,825,599 A * 10/1998 Rosenbaum ............. H02H 3/04
361/45

(Continued)

OTHER PUBLICATIONS

PCT/US2020/060468 International Search Report and Written Opinion dated Feb. 8, 2021.

*Primary Examiner* — Gary A Nash
(74) *Attorney, Agent, or Firm* — Michael Best & Friedrich LLP

(57) ABSTRACT

A temporary power delivery system includes a power source, a booth stringer, and a portable GFCI device. The GFCI device is receives current from the power source by a first terminal and delivers current to the booth stringer by a second terminal. An electronic processor of the GFCI device compares a combined magnitude of current flowing through first and second phase conductors of the GFCI device to a magnitude of current flowing through a neutral conductor of the GFCI. The electronic processor also compares a first voltage between the first phase conductor and neutral conductor to a second voltage between the second phase conductor and neutral conductor. A circuit breaker of the GFCI device is opened if a difference between the combined magnitude of phase conductor current and neutral conductor current exceeds a first threshold or a difference between the first voltage and second voltage exceeds a second threshold.

20 Claims, 3 Drawing Sheets

Related U.S. Application Data

(60) Provisional application No. 62/936,053, filed on Nov. 15, 2019.

(51) Int. Cl.
  *H02H 3/38* (2006.01)
  *H02H 3/34* (2006.01)
  *H02H 3/347* (2006.01)

(56) References Cited

U.S. PATENT DOCUMENTS

| | | | |
|---|---|---|---|
| 6,788,504 B2 * | 9/2004 | Vanderkolk | H02H 3/33 361/45 |
| 7,639,461 B2 * | 12/2009 | DiSalvo | H02H 1/06 361/42 |
| 8,300,369 B2 * | 10/2012 | Hamer | H02H 7/263 361/44 |
| 2006/0158799 A1 * | 7/2006 | Chan | H02H 5/105 361/42 |
| 2011/0216453 A1 * | 9/2011 | Haines | H02H 9/00 361/49 |
| 2017/0005443 A1 * | 1/2017 | O'Rourke | H01R 13/6683 |
| 2017/0324195 A1 | 11/2017 | Eriksen et al. | |
| 2019/0140556 A1 | 5/2019 | Dent | |

* cited by examiner

CIRCUIT INTERRUPTING DEVICE FOR PROVIDING GROUND FAULT AND OPEN NEUTRAL PROTECTION IN TEMPORARY POWER APPLICATIONS

RELATED APPLICATIONS

This application claims the benefit of U.S. Provisional Patent Application No. 62/936,053, filed Nov. 15, 2019, and U.S. Non-Provisional patent application Ser. No. 17/097,773, filed Nov. 13, 2020, the entire contents of which are hereby incorporated by reference.

FIELD

Embodiments relate to circuit interrupting devices, such as a ground fault circuit interrupter (GFCI), used in temporary power delivery applications.

SUMMARY

The Occupational Safety and Health Administration (OSHA) requires that temporary wiring installations used in settings where moisture may be present, such as construction sites or outdoor trade shows, include circuit interrupters for protecting personnel from electric shock. In particular, all 15 A, 20 A, and 30 A receptacle outlets, including extension cords and booth stringers, that are not part of the permanent wiring of a building or a structure, but are in use by personnel, shall include GFCI protection for personnel.

A GFCI is a fast-acting device that restricts the flow of electrical current to a load in response to detecting current leakage to ground ("ground fault"). For example, a GFCI senses a ground fault by detecting an imbalance in electrical current between the hot and neutral conductors that supply electric power to a load. In other words, the GFCI operates by comparing the amount of current going to and returning from the load along circuit conductors. When the amount of current going to the load differs from the amount of current returning from the load by a predesignated amount, e.g., at least 6 mA, the GFCI interrupts the current flow.

OSHA further requires that GFCIs provide open neutral protection of temporary wiring installations. An open neutral condition occurs when there is a break or other failure in the neutral conductor, which may result in a portion of the neutral conductor remaining energized even though the load is no longer operating. Accordingly, the damaged neutral conductor (or portion of it) remains energized without the presence of a return path for the current, and, thus, the open neutral condition may result in a ground fault or otherwise provide a dangerous situation. However, since the GFCI device may be powered by the failed neutral conductor, the GFCI may be unable to operate unless specifically designed to trip upon the occurrence of an open neutral condition.

One aspect of the disclosure provides a temporary power delivery system including a power source, a booth string having at least one outlet box, and a portable ground fault circuit interrupter (GFCI) device. The portable GFCI device includes a first terminal configured to receive current from the power source, a second terminal configured to deliver current to the booth stringer, a first phase conductor, a second phase conductor, a neutral conductor, and a circuit breaker. The portable GFCI device further includes an electronic processor configured to compare a combined magnitude of current flowing through the first and second phase conductors to a magnitude of current flowing through the neutral conductor and compare a first voltage between the first phase conductor and the neutral conductor to a second voltage between the second phase conductor and the neutral conductor. The electronic processor is further configured to open the circuit breaker to interrupt current flow from the power source to the booth stringer if a difference between the combined magnitude of current flowing through the first and second phase conductors and the magnitude of current flowing through the neutral conductor exceeds a first threshold or if a difference between the first voltage and the second voltage exceeds a second threshold.

Another aspect of the disclosure provides a method of operating a temporary power delivery system. The method includes receiving, by a first terminal of a portable ground fault circuit interrupter (GFCI) device, current from a power source, delivering, by a second terminal of the portable GFCI device, current to a booth stringer, and supplying, by an outlet box of the booth stringer, power to a load. The method further includes comparing, by an electronic processor of the portable GFCI device, a combined magnitude of current flowing through first and second phase conductors of the portable GFCI device to a magnitude of current flowing through a neutral conductor of the portable GFCI device and comparing, by the electronic processor, a first voltage between the first phase conductor and the neutral conductor to a second voltage between the second phase conductor and the neutral conductor. Furthermore, the method includes interrupting current flow from the power source to the booth stringer, by a circuit breaker of the portable GFCI device, when a difference between the combined magnitude of current flowing through the phase conductors and the magnitude of current flowing through the neutral conductor exceeds a first threshold and interrupting current flow from the power source to the booth stringer, by the circuit breaker, when a difference between the first voltage and the second voltage exceeds a second threshold.

Other aspects of the application will become apparent by consideration of the detailed description and accompanying drawings.

DETAILED DESCRIPTION

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more electronic processors, one or more computer-readable medium modules, one or more input/output interfaces, and various connections (e.g., a system bus) connecting the components.

Figure 1:
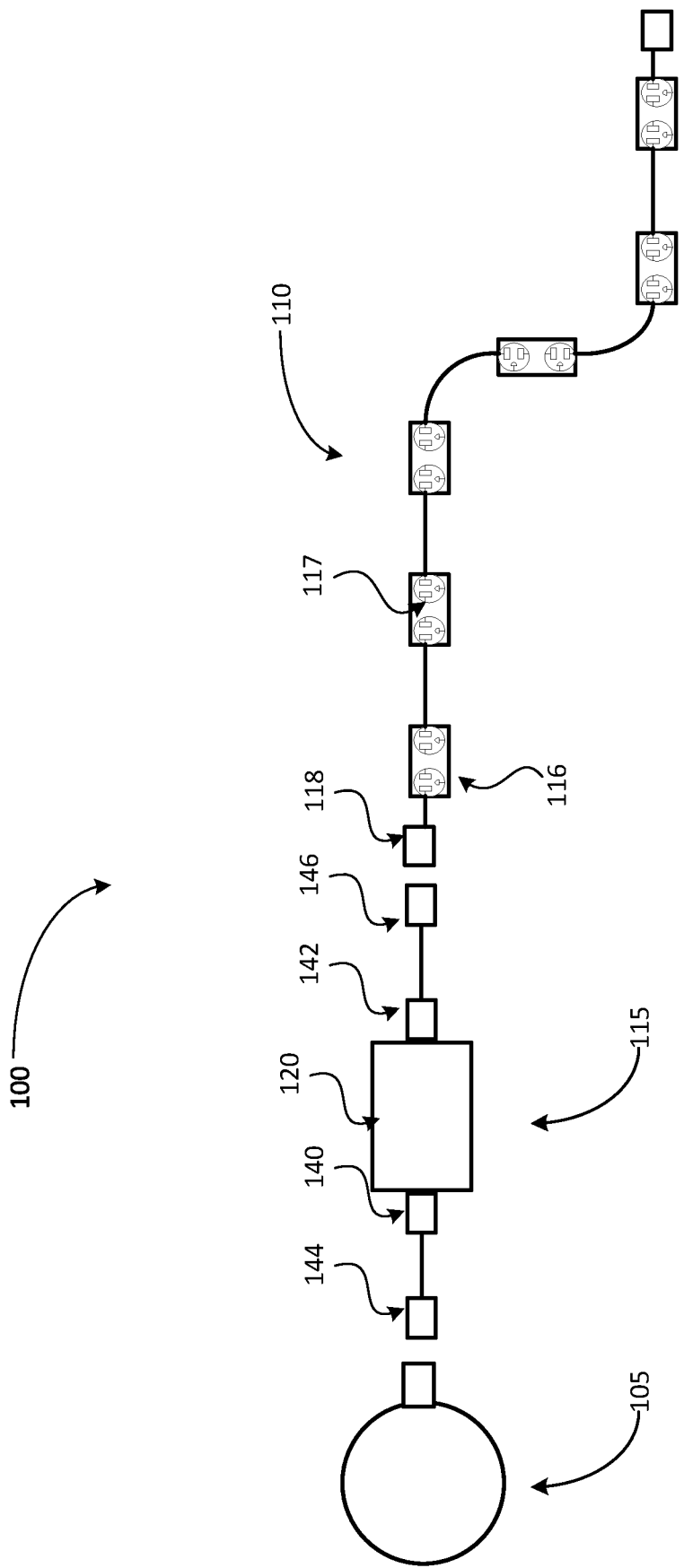
FIG. 1 illustrates a temporary power delivery system according to some embodiments.

FIG. 1 illustrates a block diagram of a temporary power delivery system 100 according to some embodiments. The temporary power delivery system 100 includes a power source 105 that is configured to supply current to a booth stringer 110 via a portable GFCI device 115. In some embodiments, the power source 105 is a 3-phase 120/208V AC power supply. In other embodiments, the power source 105 may be, but not limited to, a 3-phase 250V AC supply, a 3-phase, 480V AC supply, a 3-phase, 600V AC supply, or a 3-phase 347/600V AC supply, a 1-phase, 125V AC supply, or a 1-phase, 250V AC supply. In some embodiments, the power source 105 receives power directly from distribution lines. In other embodiments, the power source 105 is a generator.

The booth stringer 110 is configured to supply power to one or more loads, such as electrical equipment on display at a trade show, via one or more outlet boxes 116. FIG. 1 illustrates a 3-phase, 30 A booth stringer 110 that includes six outlet boxes 116. Each outlet box 116 includes two power outlets 117. Alternatively, the booth stringer 110 may include more or less than six outlet boxes 116 (for example, two, three, four, etc.). In some embodiments, the booth stringer 110 is rated to carry 20 A of current. In other embodiments, the booth stringer 110 is a 1-phase booth stringer rated to carry up to 20 A or 30 A of current. The booth stringer 110 also includes a plug 118, which is configured to be removably connected to the portable GFCI device 115.

Figure 2:
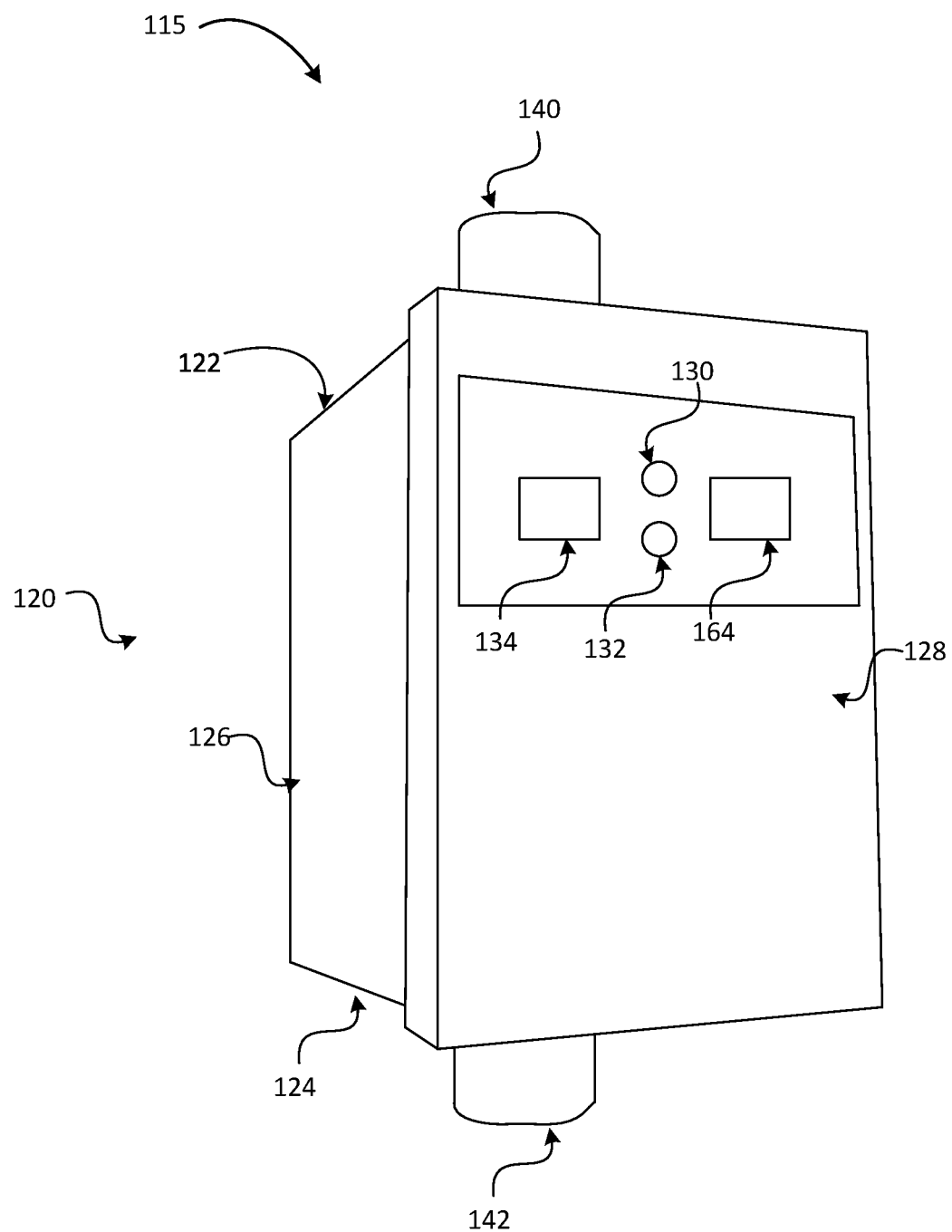
FIG. 2 illustrates a perspective view of the GFCI device of FIG. 1 according to some embodiments.

FIG. 2 illustrates a perspective view of the portable GFCI device 115 according to some embodiments of the application. The portable GFCI device 115 includes a housing 120. The housing 120 includes a first end wall 122, a second end wall 124, and a side wall 126 that extends from the first end wall 122 to the second end wall 124. A front face 128 of the side wall 126 provides a power indicator light 130 and a fault indicator light 132. The power indicator light 130 is illuminated when the portable GFCI device 115 permits current to flow from the power source 105 to the booth stringer 110. The fault indicator light 132 is illuminated when the portable GFCI device 115 inhibits, or interrupts, current flow from the power source 105 to the booth stringer 110. Current flow from the power source 105 to the booth stringer 110 may be interrupted, for example, in response to a ground fault. The front face 128 of the portable GFCI device 115 also includes a reset button 134 and a test button 136.

The portable GFCI device housing 120 supports first and second terminals 140 and 142 respectively. The first terminal 140 includes a plug 144 (FIG. 1) configured to connect to and receive current from the power source 105. The second terminal 142 is configured to connect to and deliver power to the booth stringer 110. In some embodiments, the second terminal 142 includes a female connector 146 configured to receive plug 118 of the booth stringer 110. In other embodiments (not shown), the second terminal 142 includes a pigtail connector configured to be wired directly to conductors within booth stringer 110. In the above described embodiments, the booth stringer 110 and the portable GFCI device 115 are separate components that are operable to be detachably connected to one another. However, in some embodiments, the booth stringer 110 and portable GFCI device 115 are integrally formed as one component.

In some embodiments, the portable GFCI device 115 is a 3-phase, 120/208V AC device. In such embodiments, the portable GFCI device 115 may be of the 4-pole, 5-wire connection type. The first and second terminals 140 and 142 are electrically connected via five conductors (three separate phase conductors, a neutral conductor, and a ground conductor) configured to carry 3-phase AC current. In some embodiments, the conductors may be constructed from #10 AWG cable rated to carry 30 A of current. In some embodiments, the conductors may be of the #12 AWG type rated to carry 20 A of current. In some embodiments, the portable GFCI device 115 may be one of, but not limited to, a 3-phase, 250V AC device, a 3-phase, 480V AC device, a 3-phase, 600V AC device, or a 3-phase 347/600V AC device. In some embodiments, the portable GFCI device 115 is implemented as a 1-phase device rated to one of, but not limited to, 125V AC, 250V AC, or 125/250V AC.

In some embodiments, the portable GFCI device 115 is National Electrical Manufacturer Association (NEMA) 4× rated. Accordingly, in such embodiments, the housing 120, first and second terminals 140 and 142, plug 144, and connector 146 of the portable GFCI device 115 are weather tight and provide protection against damage from, for example, dirt, rain, sleet, snow, windblown dust, splashing water, hose-directed water, and external ice formation. In addition, the components of portable GFCI device 115 are corrosion resistant and rated to operate within the temperature range of −35 degrees C. to 66 degrees C.

The portable GFCI device 115 further includes a protection circuit provided within the housing 120. The protection circuit includes an electronic processing device, such as an integrated circuit (IC) device, that is configured to detect whether a fault is present within the temporary power delivery system 100. For example, in some embodiments, the IC device may be implemented as a well-known 4141 device, such as an RV4141 device made by Fairchild Semiconductor Corporation. In some embodiments, other processing devices are used in place of the RV4141 device. In response to detecting the presence of a fault, the electronic processing device opens a circuit breaker included in the protection circuit to interrupt current flow from the power source 105 to the booth stringer 110.

In particular, the protection circuit is configured to detect the occurrence of a ground fault within the temporary power delivery system 100. The electronic processing device of the protection circuit is configured to determine whether a difference between the combined magnitude of current flowing through phase conductors of portable GFCI device 115 and a magnitude of current flowing through the neutral conductor of portable GFCI device 115 exceeds a ground fault threshold. The ground fault threshold may be, for example, 6 mA or greater. If the electronic processing device determines a difference between the combined phase conductor current and neutral conductor current exceeds a ground fault threshold, the electronic processing device interrupts current flow from the power source 105 to the booth stringer 110 by opening the circuit breaker included in the protection circuit.

For example, if the portable GFCI device 115 includes two phase conductors and a neutral conductor, the electronic processing device may be configured to determine whether the combined magnitude of current flowing through the first and second phase conductors differs from the magnitude of current flowing through the neutral conductor by an amount that is greater than the ground fault threshold. When the difference between the combined magnitude of current flowing through the first and second phase conductors and the magnitude of current flowing through the neutral conductor exceeds the ground fault threshold (e.g., 6 mA), the electronic processing device interrupts current flow from the power source 105 to the booth stringer 110 by opening the circuit breaker In addition, the protection circuit is configured to detect the occurrence of an open neutral condition within the temporary power delivery system 100. The protection circuit may be configured to detect the presence of an open neutral condition using one of a variety of known methods. For example, according to one embodiment, the electronic processing device of the protection circuit is configured to detect a first voltage equal to the voltage between a first phase conductor of the portable GFCI device 115 and the neutral conductor of the portable GFCI device 115. In addition, the electronic processing device according to this exemplary embodiment is configured to detect a second voltage equal to the voltage between a second phase conductor of the portable GFCI device 115 and neutral conductor of the portable GFCI device 115. If a difference between the first voltage and the second voltage exceeds an open neutral threshold, the electronic processing device determines that an open neutral condition is present. In response to determining that an open neutral condition is present, the electronic processing device interrupts current flow from the power source 105 to the booth stringer 110 by opening the circuit breaker included in the protection circuit.

Although the above described examples of the protection circuit are described with respect to a temporary power delivery system that includes two phase conductors and a neutral conductor, it should be understood that the protection circuit may also be implemented in a temporary power delivery system including more or less than two phase conductors. For example, the protection circuit may be included in a temporary power delivery system that includes one, three, or more phase conductors.

Figure 3:
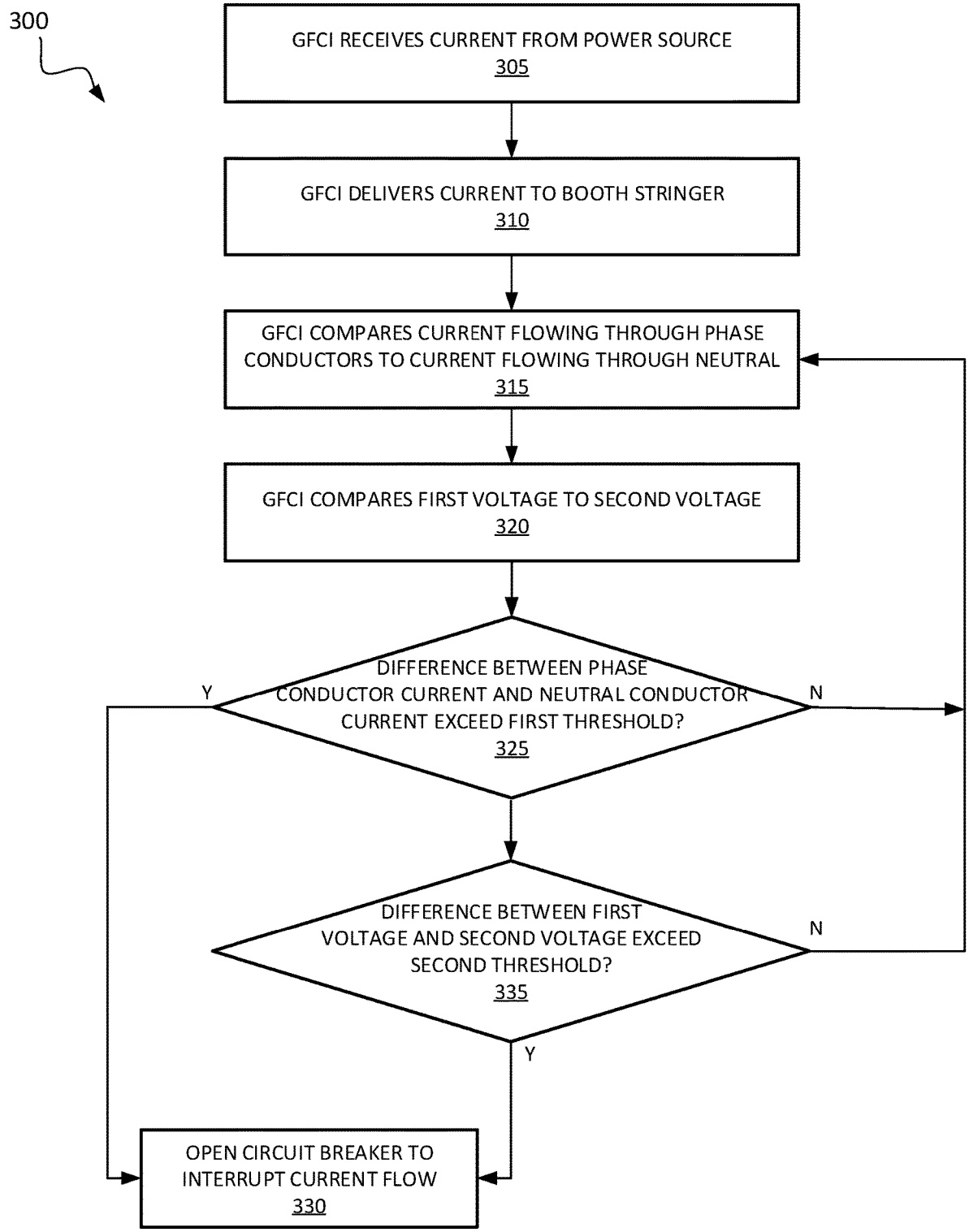
FIG. 3 is a flowchart illustrating a method 300 of operating the temporary power delivery system of FIG. 1 according to some embodiments.

FIG. 3 is a flowchart illustrating a method 300 of operating the temporary power delivery system 100 according to some embodiments. It should be understood that the order of steps disclosed in operation 300 could vary but remain within the scope of the embodiments disclosed. At block 305, the portable GFCI device receives electric current from the power source 105 via the first terminal 140. At block 310, the portable GFCI device delivers current to the booth stringer 110 via the second terminal 142. At block 315, an electronic processor of the GFCI device 115 (e.g., IC device) compares a combined magnitude of current flowing through first and second phase conductors of the portable GFCI device 115 to a magnitude of current flowing through a neutral conductor of the portable GFCI device 115. At block 320, the electronic processor of the GFCI device 115 compares a first voltage between the first phase conductor and the neutral conductor to a second voltage between the second phase conductor and the neutral conductor.

At block 325, the portable GFCI device 115 determines whether a difference between the combined magnitude of current flowing through the first and second phase conductors and the magnitude of current flowing through the neutral conductor exceeds a first threshold (e.g., 6 mA). If the difference exceeds the first threshold, the electronic processor opens a circuit breaker of the portable GFCI device to interrupt current flow from the power source 105 to the booth stringer 110 (block 330). At block 335, the electronic processor determines whether a difference between the first voltage and the second voltage exceeds a second threshold. If the difference between the first voltage and the second voltage exceeds the second threshold, the electronic processor opens the circuit breaker to interrupt current flow from the power source 105 to the booth stringer 110 (block 330).

Thus, the disclosure provides, among other things, a system and method for protecting against ground faults and open neutral conditions in a temporary power system. Various features and advantages of the application are set forth in the following claims.

What is claimed is:

1. A temporary power delivery system comprising:
   a power source;
   a portable power cord including at least one outlet; and
   a ground fault circuit interrupter (GFCI) including:
   a first terminal configured to receive power from the power source;
   a second terminal configured to deliver power to the portable power cord;
   a first phase conductor, a second phase conductor, and a neutral conductor;
   a circuit breaker; and
   an electronic processor configured to open the circuit breaker when a difference between a combined magnitude of current flowing through the first and second phase conductors and a magnitude of current flowing through the neutral conductor exceeds a first threshold.

2. The temporary power delivery system of claim 1, wherein the electronic processor is further configured to determine that a ground fault has occurred when the difference between the combined magnitude of current flowing through the first and second phase conductors and the magnitude of current flowing through the neutral conductor exceeds the first threshold.

3. The temporary power delivery system of claim 1, wherein the electronic processor is further configured to open the circuit breaker when a first voltage between the first phase conductor and the neutral conductor differs from a second voltage between the second phase conductor and the neutral conductor by more than a second threshold.

4. The temporary power delivery system of claim 3, wherein the electronic processor is further configured to determine that an open neutral condition has occurred when the difference between the first voltage and the second voltage exceeds the second threshold.

5. The temporary power delivery system of claim 1, wherein the portable power cord is a booth stringer.

6. The temporary power delivery system of claim 5, wherein the GFCI device and the booth stringer are integrally formed as a single component of the temporary power delivery system.

7. The temporary power delivery power system of claim 1, wherein the GFCI device is removably coupled to the power source and the portable power cord.

8. The temporary power delivery system of claim 7, wherein the second terminal of the GFCI device includes a pigtail connector.

9. The temporary power delivery system of claim 7, wherein the second terminal of the GFCI device includes a plug.

10. A method of operating a temporary power delivery system comprising:
receiving, by a first terminal of a ground fault circuit interrupter (GFCI) device, current from a power source;
delivering, by a second terminal of the GFCI device, current to a portable power cord;
supplying, by an outlet of the portable power cord, power to a load; and
interrupting current flow from the power source to the portable power cord, by a circuit breaker of the GFCI device, when a difference between a combined magnitude of current flowing through first and second phase conductors of the GFCI device and a magnitude of current flowing through a neutral conductor of the GFCI device exceeds a first threshold.

11. The method of claim 10 further comprising determining, by the electronic processor, that a ground fault has occurred when the difference between the combined magnitude of current flowing through the first and second phase conductors and the magnitude of current flowing through the neutral conductor exceeds the first threshold.

12. The method of claim 11 further comprising illuminating, by the electronic processor, a display of the GFCI device to indicate the occurrence of the ground fault.

13. The method of claim 10 further comprising interrupting current flow from the power source to the portable power cord, by the circuit breaker, when a first voltage between the first phase conductor and the neutral conductor differs from a second voltage between the second phase conductor and the neutral conductor by more than a second threshold.

14. The method of claim 13 further comprising determining, by the electronic processor, that an open neutral condition has occurred when the difference between the first voltage and the second voltage exceeds the second threshold.

15. The method of claim 14 further comprising illuminating, by the electronic processor, a display of the GFCI device to indicate the occurrence of the open neutral condition.

16. The method of claim 10, wherein the portable power cord is a booth stringer.

17. A power system comprising:
a power source;
a booth stringer; and
a ground fault circuit interrupter (GFCI) including:
a first terminal configured to receive power from the power source;
a second terminal configured to deliver power to the booth stringer;
a first phase conductor, a second phase conductor, and a neutral conductor;
a circuit breaker; and
an electronic processor configured to open the circuit breaker when at least one of:
a difference between a combined magnitude of current flowing through the first and second phase conductors and a magnitude of current flowing through the neutral conductor exceeds a first threshold, and
a first voltage between the first phase conductor and the neutral conductor differs from a second voltage between the second phase conductor and the neutral conductor by more than a second threshold.

18. The power system of claim 17, wherein the GFCI device and the booth stringer are integrally formed as a single component.

19. The power system of claim 17, wherein the GFCI device is removably coupled, by the second terminal, to the booth stringer.

20. The power system of claim 17, wherein the booth stringer is a 3-phase, 30 ampere booth stringer.

* * * * *